United States Patent Office 2,727,016
Patented Dec. 13, 1955

2,727,016
ACRYLAMIDES OF N-AMINOALKYL ALKYLENE UREAS AND THEIR POLYMERS

Elinor M. Hankins and Sidney Melamed, Philadelphia, Pa., assignors to Rohm & Haas Company, Philadelphia, Pa., a corporation of Delaware No Drawing. Application April 10, 1953,
Serial No. 348,109

25 Claims. (Cl. 260—77.5)

This invention deals with amides of the structure

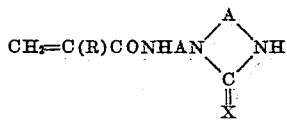

wherein R is hydrogen or the methyl group, X is oxygen or sulfur, and A is an alkylene chain of two to three carbon atoms with at least two carbon atoms between nitrogen atoms. The two A's need not be identical. This invention further deals with polymers of these amides and with copolymers formed with these amides and other polymerizable vinylidene compounds, particularly monovinylidene compounds, which are polymerizable with free radical catalysts.

The compounds of this invention are useful as chemical intermediates. They react, for example, at the double bond with many compounds having reactive hydrogen. For example, they react by addition with alcohols, mercaptans, primary or secondary amines, nitroalkanes, malonates, acetoacetates, etc. or with sodium bisulfite. They react with alkylating and acylating agents to give complex compounds. The polymers and copolymers are useful in coating compositions and textile finishing compositions, as adhesives, as paper treating agents, and as additives for viscose dopes and cellulose acetate dopes to improve the properties of fibers and films formed therefrom. They react with formaldehyde to form highly useful condensates.

The above amides are advantageously prepared by reacting an acrylyl or methacrylyl halide of the formula $$CH_2=C(R)COHal$$

where Hal is chlorine or bromine, with an N-aminoalkyl-N,N'-alkylene-urea or -thiourea. The reaction is best carried out in an inert organic solvent and in the presence of an acceptor for hydrogen halide. Temperatures between —20° and about 50° C. are generally used.

As an N-aminoalkyl-N,N'-alkyleneurea or thiourea there is used a compound of the structure

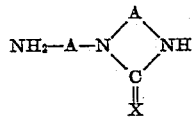

where A and X have the meanings stated above. Typical compounds are 1-(2-aminoethyl)-2-imidazolidone, 1-(2-aminoethyl)-2-imidazolidinethione, 1-(2-aminopropyl)-4(or 5)-methyl-2-imidazolidone, 1-(3-aminopropyl)hexahydro-2-pyrimidone, 1-(3-aminopropyl)hexahydro-2-thiopyrimidone, etc.

Excess of this reactant can be used as an acceptor for hydrogen halide, which is formed in the reaction. Where the resulting amine hydrohalide is insoluble in the solvent used, it can be removed by filtering. Instead of using an excess of this reactant, however, there may be used other basic materials including alkali metal bases and tertiary amines, such as sodium hydroxide, sodium bicarbonate, potassium carbonate, pyridine, triethylamine, etc.

As solvent, there may be used one or more inert organic solvents, such as carbon tetrachloride, chloroform, ethylene dichloride, acetonitrile, dimethylformamide, ethyl ether, isopropyl ether, and the like.

When the aminoalkylalkyleneurea is pure and/or the temperature of reaction is kept low, the presence of a polymerization inhibitor is not necessary, but it may be used, if so desired. It is advisable to use such inhibitor when the reaction is performed without good temperature control or when the temperature is allowed to rise rapidly, as when, for example, it is desired to accelerate and complete the reaction in a short time.

Useful inhibitors include trinitrotoluene, selenium dioxide, hydroquinone, copper, copper carbonate, p-hydroxydiphenylamine, etc. Presence of a polymerization inhibitor is particularly desirable during the concentrating and stripping of the products.

After removal of the hydrogen halide as an amine hydrohalide or alkali metal salt, the reaction mixture is worked up in any convenient way. Some of the amides formed may be extracted with water from the solvent system. Again, the organic solvent may be stripped off to yield an oil or a solid, which is the desired amide. Where solids are obtained, they can be purified by recrystallization.

The monomeric amides thus prepared are polymerizable with the aid of a free radical catalyst, including one or more from the class of peroxide catalysts, organic or inorganic, or one or more from the class of azo catalysts. They are also polymerizable under the action of heat and light. Typical organic peroxide catalysts include benzoyl peroxide, acetyl peroxide, caproyl peroxide, butyl perbenzoate, butyl hydroperoxide, and the like. One or a mixture of catalysts may be used in amounts of about 0.05% to 2% based on the weight of monomer. Polymerization may be effected in bulk, in solution, or in emulsion. In the last case use of a redox system is very effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

Temperatures of polymerization fall between 0° and 100° C., a range of 40° to 75° C. being preferred.

The azo catalysts are compounds in which the

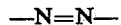

group is attached to aliphatic carbon atoms, at least one of which is tertiary. In these one of the carbons bonded to the tertiary carbon atom has its remaining valences satisfied by at least one element from the class consisting of oxygen and nitrogen. Typical catalysts are azodiisobutyronitrile, azodiisobutyramide, dimethyl or diethyl or dibutyl azodiisobutyrate, azobis(α,γ-dimethylvaleronitrile), azobis(α-methylbutyronitrile), azobis(α-methylvaleronitrile), dimethyl or diethyl azobismethylvalerate, and the like.

In the following illustrative examples there are given additional details of typical preparations of compounds and polymers of this invention. Parts are by weight.

Example 1

There were mixed 129 parts of N-(β-aminoethyl)-ethyleneurea containing 0.009 part of hydroquinone and 260 parts of chloroform in a reaction vessel equipped with stirrer, condenser, thermometer, and dropping funnel. The vessel was cooled in an ice-salt bath to —1° C. There was then slowly added over 2.5 hours acrylyl chloride to a total of 45 parts, while the temperature was held between 0° and 5° C. The cooling bath was removed and the mixture was stirred for six hours with the temperature rising to over 30° C. Amine hydrochloride formed as a precipitate. It was removed by filtering. The precipitate was washed three times with 150 part portions of chloroform. The white solid thus obtained corresponded almost exactly in composition to aminoethylethyleneurea hydrochloride. The filtrate and washings were combined and filtered through a diatomaceous filter-aid. The filtrate was stirred and evaporated under reduced pressure on a steam bath. The residue was stripped at 50° C./0.3 mm. for 2.5 hours and then at 60° C./0.3 mm. for an hour. The residue consisted of 99 parts of a light brown brittle solid which was soluble in water and in ethanol or methanol. It contained by analysis 49.3% of carbon, 7.12% of hydrogen, and 23.5% of nitrogen. This composition corresponds nearly to that of $C_8H_{13}N_3O_2$ for which corresponding theoretical values are 52.4%, 7.15%, and 22.9%. The product was thus essentially N-(β-acrylamidoethyl)ethyleneurea.

Example 2

The above procedure was followed in general with a half gram mole of aminoethylethyleneurea, one half gram mole of acrylylchloride, and 0.6 gram mole of sodium carbonate. A yield of 92% of N-(β-acrylamidoethyl)-ethyleneurea was obtained. This compound has the structure

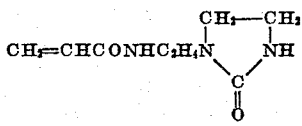

Example 3

A solution of 258 parts of aminoethylethyleneurea in 450 parts of chloroform was cooled in an ice-salt bath to 0° C. Thereto was slowly added with stirring and cooling to maintain the temperature at about 0° C. (0°–5° C.) 104.6 parts of methacrylyl chloride. Additional chloroform in an amount of 150 parts was added. The mixture was stirred for five hours at the ice-bath temperature. The amine hydrochloride which formed as a solid was removed by filtering. The solid was rinsed with chloroform. The filtrate and washings were combined and evaporated to dryness at about 25° C. under reduced pressure to give 187 parts of a white crystalline solid which melted at 114.5°–117° C.

Recrystallization of the above product from acetone gave material melting at 121.3°–121.8° C. and containing 54.5% of carbon, 7.8% of hydrogen, and 21.5% of nitrogen. Theoretical values are 54.8%, 7.7%, and 21.3%, respectively, for N-(β-methacrylamidoethyl)-ethyleneurea.

These monomers are useful chemical intermediates. For example, they react with tetradecyl mercaptan in the presence of an alkaline catalyst to form an alkylthio derivative, which can be applied to textile fabrics to provide water-repellency. Two moles of the above monomers react with one mole of hexamethylenediamine. The resulting product can be incorporated with urea or melamine, the mixture being then reacted with formaldehyde to give desirable resinous condensates. The above monomers are useful for impregnating leather, in which they diffuse into the cell walls, where they can be polymerized and permanently retained.

An unusual reaction of N-(beta-methacrylamidoethyl)-ethyleneurea is the formation of a monomeric methoxymethyl derivative. Such a reaction would, of course, be impossible with a monomer which was sensitive to acid. The other monomers of this invention can also be converted to methoxymethyl derivatives. Other alcohols, such as ethanol, propanol, butanol, and the like, may be used to replace the methanol. These alkoxymethyl monomers may be polymerized by free radical catalysts and they may be copolymerized with vinylidene monomers. One advantage of these alkoxymethyl monomers is that they may be used in polymerizations and copolymerizations where the later use of free formaldehyde might be difficult or impossible. Also, the necessity of removing excess free formaldehyde is avoided.

The preparation of the methoxymethyl derivative of N-(β-methacrylamidoethyl)-2-imidazolidone follows: To a solution of 49.5 parts of paraformaldehyde in 400 parts of methanol at pH 8 was added 98.5 parts of N-(β-methacrylamidoethyl)-2-imidazolidone and 0.05 part of hydroquinone. The mixture was heated with stirring at 50°–60° C. for one hour at pH 8. The pH was adjusted to 2.5 with hydrochloric acid and the mixture was stirred at 25°–30° C. for one hour. After neutralization with sodium hydroxide, methanol and excess formaldehyde were removed by distillation at reduced pressure on the steam bath. This stripping was finished by heating for one day at 95° C./0.5 mm. There was obtained 121 parts of a viscous liquid which was soluble in water, methanol, dimethylformamide, and isopropyl alcohol. Analytical results indicated the formation of a monomethoxymethyl derivative. The obtained results were 52.38% carbon, 7.86% hydrogen, 17.2% nitrogen, 11.80% methoxy, 12.43% total formaldehyde, and 0.62% free formaldehyde. The theoretical values for

are 54.75% carbon, 7.94% hydrogen, 17.42% nitrogen, 12.86% methoxy, and 12.44% total formaldehyde.

This compound could be polymerized in the usual manner. For example, 10 parts methoxymethyl N-(β-methacrylamidoethyl)-2-imidazolidone, 30 parts of dimethylformamide, and 0.55 part of dimethyl azodiisobutyrate were heated under nitrogen for 23 hours at 75° C. The mixture was recatalyzed with 0.55 part of the azo ester and heated for 20 hours at 75° C. under nitrogen. The polymer was precipitated with acetone, dissolved in water, reprecipitated with acetone, and dried at 60° C./0.5 mm. for 16 hours. There was obtained 6.0 parts of an almost white, brittle solid which contained 53.05% carbon, 7.81% hydrogen, and 16.72% nitrogen.

Example 4

A solution of 145 parts of N-(β-aminoethyl)ethylenethiourea was prepared in 600 parts of chloroform in a reaction vessel equipped with stirrer, thermometer, and dropping funnel. The solution was cooled to 5° C. and thereto methacrylyl chloride was added to a total of 52.3 parts, while the reaction mixture was maintained at 0°–5° C. by external cooling. Addition was made of 375 parts of chloroform and the mixture was stirred for five hours at 0° C. It was then filtered to remove the solid material which had formed. The filtered solid was triturated with 750 parts of chloroform and repeatedly washed with chloroform, the filtrate and wash liquors being combined. The combined liquors were evaporated at 20°–30° C. under reduced pressure, the pressure being finally reduced to 0.5 mm. This yielded 75.5 parts of a light tan solid, having a melting point of 132°–136° C., a 71% yield of product, 1-(β-methacrylamidoethyl)thioimidazolidone-2. This product was recrystallized from acetone to give a white crystalline solid, melting at 133°–134° C. It was found soluble in water, ethanol, acetone, and chloroform. Analysis of this material gave the following data: carbon, 50.78%; hydrogen, 6.87%; nitrogen, 19.57%; and sulfur, 15.40%. Corresponding theoretical values for $C_9H_{15}N_3SO$ are 50.69%, 7.09%, 19.70%, and 15.03%, respectively.

This compound is useful in the preparation of polymers and copolymers which find application in paper and textiles. These react with wool to stabilize it.

Example 5

(a) There were mixed in a reaction vessel equipped with stirrer, thermometer, and condenser 360 parts of 3,3'-iminobispropylamine and 150 parts of urea. The mixture was heated with stirring over a 4.5 hour period to a temperature of 204° C. There resulted 424 parts of a tan, viscous liquid. This was distilled at reduced pressure with a nitrogen bubbler. The fraction taken at 158°–160° C./0.3 mm. amounted to 187.5 parts. It solidified and the solid melted at 48°–49° C. This material corresponded by analysis to 1-(3-aminopropyl)hexahydro-2-pyrimidone. It contained 53.3% of carbon, 9.3% of hydrogen, and 26.8% of nitrogen. Theoretical values are 53.48%, 9.62%, and 26.73%, respectively. The molecular weight as determined ebullioscopically was 164 (theory 157).

(b) A solution of 157.2 parts of 1-($\gamma$-aminopropyl)-hexahydro-2-pyrimidone was made in 600 parts of chloroform. This solution was cooled and stirred and thereto was added at 0°–5° C. 52.3 parts of methacrylyl chloride. Stirring was continued for two hours with the temperature of the reaction mixture at 0° C. The amine hydrochloride which formed as a solid was filtered off and washed repeatedly with chloroform, filtrate and washings being combined. Chloroform was evaporated under reduced pressure to leave a white solid. It contained 18.4% of nitrogen and corresponded in composition to 1-($\gamma$-methacrylamidopropyl)hexahydro-2-pyrimidone.

This product may also be collected by extracting the chloroform solution with water. The resulting aqueous solution may be used in polymerization reactions.

Example 6

(a) To 694 parts of 3,3'-iminobispropylamine in a reaction vessel equipped with stirrer, thermometer, condenser, and dropping funnel there was added with stirring carbon bisulfide to a total of 380 parts over six hours. Rate of addition was adjusted so that the reaction mixture could be readily stirred and the temperature kept at 60° to 75° C. The reaction mixture was then heated with stirring to 195° C. over a period of 1.5 hours. There resulted 894 parts of a dark brown, viscous liquid which slowly crystallized. The theoretical yield would have been 904 parts. The reaction product was recrystallized several times from ethanol to give a white, crystalline solid melting at 116°–117° C. It was soluble in water, methanol, ethanol, chloroform, and acetone. It contained by analysis 48.77% of carbon, 8.61% of hydrogen, 24.2% of nitrogen, and 18.7% of sulfur, thus corresponding to 1-($\gamma$-aminopropyl)hexahydro-2-thiopyrimidone, for which the theoretical values are 48.52%, 8.73%, 24.25%, and 18.50%, respectively.

(b) A solution was prepared from 103.8 parts of 1-($\gamma$-aminopropyl)hexahydro-2-thiopyrimidone and 600 parts of chloroform and cooled to about 3° C. There was added thereto over four hours with stirring and cooling to maintain the temperature below 8° C. methacrylyl chloride to a total of 31.4 parts. The reaction mixture was diluted with 300 parts of chloroform and stirred at about 0° C. for six hours. Amine hydrochloride separated as a solid which was filtered off. It was triturated with 450 parts of chloroform and washed four times with 150 part portions of chloroform. The amine hydrochloride was dried. It amounted to 59 parts. The washings were combined with the filtrate and the solution of reaction product was evaporated to dryness at 20°–30° C. under reduced pressures down to 0.5 mm. to yield 92 parts of a very light yellow solid. This was recrystallized from acetone to give 58.2 parts of a white crystalline solid, melting at 142.5°–143.5° C. Upon a second recrystallization the melting point rose to 146.5°–147.5° C. This product contained by analysis 54.66% of carbon, 7.87% of hydrogen, 17.30% of nitrogen, and 13.16% of sulfur, thus corresponding in composition to 1-($\gamma$-methacrylamidopropyl)hexahydro-2-thiopyrimidone, for which the theoretical values are 54.74%, 7.94%, 17.41%, and 13.28%, respectively.

An aqueous 1% solution of this compound completely inhibits the germination of spores of *Macrosporium sarcinaeforme* and *Sclerotinia fructicola* in standard fungitoxicity tests, establishing this compound as a fungicidal agent. Since this compound has but limited solubility in water, being, for example, considerably less water soluble than N-($\beta$-methacrylamidoethyl)-2-imidazolidone, it is efficient as a comonomer in emulsion polymerizations.

Example 7

There was prepared as in Example 1 N-($\beta$-acrylamidoethyl)ethyleneurea in a yield of 98% in chloroform solution. This solution was extracted with water to give an almost colorless, aqueous solution of this material, the solution containing about 33% solids. The solution was acidified with acetic acid. About 0.1% of mercaptoethanol was added. The air above the solution was replaced with nitrogen. About 0.3% of ammonium persulfate was added. Polymerization carried the temperature of the system to 40° C. Additional ammonium persulfate was added. After two hours the yield of polymer was 95%. The mixture was poured into acetone. Polymer precipitated. The clear liquor was decanted off. The product was dried at 60° C./0.5 mm. It was a white, hygroscopic polymeric material of the correct analysis. This is a useful textile sizing, being soluble in water and readily applied from aqueous solutions.

One of the distinctive properties of the acrylamido-alkylalkyleneureas is that they may be polymerized over a wide range of pH, a range of pH 3 to 10 being practical. This is in contrast to various vinyl ethers which are unstable on the acid side. The polymers may be formed with a great range of molecular sizes. They have considerable thermal stability.

These polymers imparted wet strength to paper even without the addition of formaldehyde. For example, when 2% of poly(N-($\beta$-acrylamidoethyl)ethyleneurea) was added to unbleached kraft pulp with 3% alum and applied at pH 4 the paper obtained therefrom had tensile strengths of 2.9 lbs./inch wet after one day, 4.3 lbs./inch wet after seven days, 5.7 lbs./inch wet after 28 days, and 31.1 lbs./inch dry after 28 days.

Formaldehyde derivatives of these polyacrylamides were very effective wet-strength paper resins which were remarkable for their unusual stability. An example of the preparation and evaluation of such a resin follows:

A solution of 7.33 parts of the poly(N-($\beta$-acrylamidoethyl)ethyleneurea) described above in 20 parts of water was added to 16.48 parts of 36.4% aqueous formaldehyde in 15 parts of water. The pH of the reaction mixture was maintained at 8.5–9.0 by addition of aqueous sodium hydroxide. The reaction mixture was heated for two hours at 65° C. This product was applied at 1% concentration to unbleached kraft pulp with 3% alum at pH 4. The paper obtained had tensile strengths in pounds per inch of 10.1 after one day wet, 10.4 after 7 days wet, 10.9 after 28 days wet, and 37.7 after 28 days dry.

Example 8

There was prepared N-($\beta$-acrylamidoethyl)ethyleneurea as above. A solution of 12 parts was made in 19 parts of water. The pH was adjusted to 4.9 with acetic acid. Mercaptoethanol was added in an amount of 0.3 part. The solution was sparged with nitrogen, treated with 0.06 part of dimethyl azodiisobutyrate, and heated at 65° C. for 20 hours. Polymer was isolated by pouring the aqueous solution into acetone. The yield of polymer was 94%.

The polymers are unusual since they impart wet strength to paper without use of formaldehyde and are of interest, therefore, in the preparation of such special papers as photographic papers.

Example 9

Polymerizations of N-(β-methacrylamidoethyl)ethyleneurea were carried out as described in the two previous examples. Whether the persulfate was used as catalyst or the azo catalyst, white solids were obtained which contained carbon, hydrogen, and nitrogen in proportions corresponding to those in the monomer, but the polymers gave viscous solutions. In different preparations of polymers aqueous 33⅓% solutions were obtained with viscosities varying from B to W on the Gardner-Holdt scale. The aqueous solutions can be heated to sterilize them without causing hydrolysis or condensation.

Poly(N-(β-methacrylamidoethyl)ethyleneurea) prepared as described above was applied to unbleached kraft at 2% concentration. To this was added 3% alum at pH 4. The derived paper showed wet tensile strength of 2.2 lbs./inch after one day, 4.5 lbs./inch after seven days, and 5.7 lbs./inch after 28 days. The dry tensile strength was 32.2 after 28 days. Thus wet strength could be obtained even without the addition of formaldehyde.

Condensation of these polymethacrylamides with formaldehyde, however, yielded wet-strength resins of exceptional stability and high efficiency.

The poly(N-β-methacrylamidoethyl)ethyleneurea) prepared as described above, which had a Gardner-Holdt viscosity at 33⅓% solids in water of 0, was converted to a resin suitable for use in paper as follows: A solution of 7.89 parts of the polymer in 40 parts of water was added in 20 minutes to a solution of 16.48 parts of aqueous 36.4% formaldehyde in 20 parts of water. The pH of the reaction mixture was maintained at 8.5 by the addition of aqueous 5% sodium carbonate solution. The reaction mixture was heated at 65° C. for six hours. This resin was applied at various concentrations to unbleached kraft at pH 4.0 with 3% alum. The tensile strength values for the derived paper sheets are given below:

| Concentration of Resin | Tensile Strength (lbs./inch) | | |
|---|---|---|---|
| | 1 Day, Wet | 7 Days, Wet | 7 Days, Dry |
| 0.125% | 6.3 | 6.8 | 27.9 |
| 0.25% | 7.9 | 8.3 | 32.0 |
| 0.50% | 9.8 | 9.8 | 29.3 |
| 1.00% | 11.0 | 11.1 | 36.9 |

Example 10

(a) A solution was prepared from 10 parts of N-(β-methacrylamidoethyl)ethylenethiourea, 35 parts of dimethylformamide, and 0.05 part of dimethyl azodiisobutyrate. This solution was heated under nitrogen for 16 hours at 65° C. The resulting solution of polymer was poured into 600 parts of acetone to give a precipitate, which was collected on a filter. The collected solid was dissolved in dimethylformamide and reprecipitated with acetone. The precipitate was filtered off and dried at 60° C. for a half hour under 40 mm. pressure, and for 20 hours under 0.5 mm. pressure. There was obtained a white, brittle solid amounting to 9.7 parts. This solid was insoluble in acetone, almost insoluble in water, but soluble in formic acid and in dimethylformamide. It contains by analysis 50.1% of carbon, 7.3% of hydrogen, 19.1% of nitrogen, and 13.6% of sulfur. Corresponding theoretical values are 50.69%, 7.09%, 19.70%, and 15.03%, respectively.

(b) A solution containing 10 parts of N-(β-methacrylamidoethyl)ethylenethiourea, 40 parts of dimethylformamide, 0.05 part of mercaptoethanol, and 0.1 part of dimethyl azodiisobutyrate was heated under nitrogen at 65° C. for 16 hours. The reaction mixture was worked up as in part (a) to give 7.7 parts of white, brittle polymer, which had the solubilities described above.

The polymer was found to react with formaldehyde to form a methylol derivative. The methylolated polymer was found effective in promoting wet strength in paper. When this product was used at 1% in conjunction with alum at 3% in unbleached kraft pulp, the paper formed therefrom had the following wet strengths: at one day, 3.6 lbs./inch; after seven days 4.2 and after 28 days 5.3 lbs./inch.

Example 11

(a) A solution of 15 parts of 1-(γ-methacrylamidopropyl)hexahydro-2-pyrimidone in 30 parts of water was prepared by extracting a chloroform solution as described in Example 5. This solution had a pH of 4.7. Thereto were added about 0.3 part of mercaptoethanol, 0.05 part of ammonium persulfate, and 0.05 part of sodium hydrosulfite. The mixture was heated to 50° C. and over 1.25 hours two additional portions of 0.05 part each of ammonium persulfate were added. The reaction mixture was treated with acetone to precipitate the polymer which had formed. The polymer was separated by decantation of acetone, washed with acetone, dissolved in water, and reprecipitated with acetone. It was dried at 60° C./0.5 mm. for 18 hours. Conversion was 93%. An aqueous 33⅓% solution had a Gardner-Holdt viscosity of C.

(b) A solution containing 15 parts of 1-(γ-methacrylamidopropyl)hexahydro-2-pyrimidone, 30 parts of water, about 0.3 part of mercaptoethanol, and 0.1 part of dimethyl azodiisobutyrate was heated under nitrogen at 65° C. for 16 hours. The resulting polymer was precipitated with acetone as above. There was obtained an almost white, brittle polymer in an amount of 1.35 parts. An aqueous 33⅓% solution thereof had a Gardner-Holdt viscosity of B.

The polymers of N-(γ-methacrylamidopropyl)hexahydro-2-pyrimidone, prepared by either method of polymerization, could be readily converted to stable, efficient wet-strength paper resins. For example, 4.51 parts of poly(N-(γ-methacrylamidopropyl)hexahydro-2-pyrimidone), the Gardner-Holdt viscosity of a 33⅓% aqueous solution of which was C, was dissolved in 25 parts of water. This solution was added in fifteen minutes to a solution of 8.27 parts of 36.4% aqueous formaldehyde in 25 parts of water. The pH was maintained at 8.5 during the addition. The reaction mixture was then heated for two hours at 65° C. When 1% of this resin was applied to unbleached kraft with 3% alum at pH 4, the wet strength values in pounds per inch of the handsheets obtained were 8.8 after one day's aging, 9.7 after seven days, and 10.1 after 28 days.

Example 12

(a) A solution was prepared from 10 parts of 1-(γ-methacrylamidopropyl)hexahydro-2-thiopyrimidone, 40 parts of dimethylformamide, 0.05 part of mercaptoethanol, and 0.1 part of dimethyl azodiisobutyrate. It was heated under nitrogen at 65° C. for 16 hours. The reaction mixture was poured into 600 parts of acetone to precipitate polymer, which was filtered off, washed with acetone, dissolved in 90% formic acid, and reprecipitated with acetone. The acetone-insoluble material was separated and dried for 18 hours at 65° C./0.5 mm., yielding 8.4 parts of a white, brittle solid, which was freely soluble in formic acid and somewhat soluble in dimethylformamide. It contained by analysis 52.4% of carbon, 7.7% of hydrogen, 16.3% of nitrogen, and 12.2% of sulfur, thus corresponding to the polymer of the starting methacrylamidopropylhexahydrothiopyrimidone, theoretical values for which are 54.74%, 7.94%, 17.41%, and 13.28%, respectively.

(b) A solution containing 10 parts of 1-(γ-methacrylamidopropyl)hexahydro-2-thiopyrimidone, 0.15 part of mercaptoethanol, 0.1 part of dimethyl azodiisobutyrate, and 40 parts of dimethylformamide was heated under nitrogen at 65° C. for 16 hours. The reaction mixture was poured into acetone to precipitate the polymer, which was separated, dissolved in dimethylformamide, and reprecipitated with acetone. Precipitate was separated by decantation and dried at 60° C. at a reduced pressure of 0.5 mm. There was obtained a white, brittle solid in an amount of 8.5 parts.

The polymers of this invention react with formaldehyde in aqueous solution or from a revertible polymer to form valuable, useful methylol derivatives. Both polymers and their methylol derivatives may be added to viscose dopes which are then formed into films or fibers. When these are heated at 220°–300° F., there is an apparent reaction for the films and fibers are improved in tensile properties and resistance to water and to common solvents for cellulose. As an example, a viscose dope was treated with 10% of its weight of viscose of poly(methacrylamidopropyl)hexahydropyrimidone. Films were formed therefrom under acid regeneration. They were immersed in an aqueous acidified 5% formaldehyde solution and cured at 300° F. for 10 minutes. The film was then insoluble in aqueous 10% caustic soda solution, concentrated solutions of trimethylbenzylammonium hydroxide, and other cellulose solvents.

The acrylamidoalkyl hexahydropyrimidones and imidazolidones and their sulfur analogues enter into interpolymers with other vinylidene compounds which are polymerizable with free radical catalysts. Catalysts for interpolymers are the same as those discussed above under the subject of polymer formation with conditions essentially like those there described.

Typical vinylidene compounds for copolymerization or interpolymerization include acrylic and methacrylic acids, their esters, amides, salts, and nitriles, itaconic acid and its functional derivatives, particularly its esters, maleic anhydride or maleic and fumaric acids and their esters, vinyl ethers and esters, vinyl sulfides, styrene and its homologues and analogues, vinylpyridine, vinylcarbazol, and allyl esters of monocarboxylic acids. Specific vinylidene compounds are methyl, ethyl, isopropyl, butyl, tert.-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert.-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, α-methylstyrene, p-methylstyrene, p-chlorostyrene, vinylnaphthalene, etc. When two or more free-radical-polymerizable vinylidene groups occur, as in divinylbenzene, trivinylbenzene, ethylene diacrylate or methacrylate, bis(vinyloxyethyl)-urea, or vinyloxyethyl acrylate or methacrylate, insoluble interpolymers result.

Interpolymerization may be effected in bulk, in solution, in emulsion, or in suspension. A wide range of compositions may be utilized. Copolymers are preferably constituted with 5% to 95% of one or more of the acrylamides of this invention. Even proportions up to 99% have been used where a minor variation in the polymeric amide is desired, while as little as 1% of these amides can in some cases influence the properties of a polymerized vinylidene compound. In general two sets of conditions are frequently encountered, one, where 1% to about 30% of an acrylamide of this invention is used to modify the nature of another kind of vinylidene polymer, and the other, where the polymers of the amides of this invention can be regarded as extended, diluted, or modified with 5% to 50% of another type of polymerizable compound.

Example 13

To a solution of 71 parts of aminoethylethyleneurea in 113 parts of boiled water was slowly added with stirring at 20°–25° C. acrylic anhydride in an equivalent amount. The mixture was stirred for an hour. The resulting product was a colorless solution of 255 parts containing 50% of a mixture of acrylic acid and N-(β-acrylamidoethyl)-ethyleneurea.

To 80 parts of this solution was added 1.5 parts of mercaptoethanol. Nitrogen was bubbled therethrough. Addition was made of 0.05 part of ammonium persulfate. The temperature of the mixture rose rapidly to 60° C. and an ice bath was applied to hold the temperature in the range of 50°–60° C. Addition was made of 0.05 part of ammonium persulfate with a small temperature rise. After two hours another 0.05 part of ammonium persulfate was added and the mixture was held at 46°–50° C. for an hour. The mixture then had a viscosity of K. It was poured into 750 parts of acetone. Copolymer was precipitated and settled. The liquor was decanted off. The copolymer was dissolved in water and reprecipitated with acetone. The solid was separated and dried at 60° C./0.5 mm. to give 35 parts of a white, brittle solid, a copolymer of acrylic acid and N-(β-acrylamidoethyl)ethyleneurea.

This copolymer is useful in improving properties of paper. It can be insolubilized or fixed by use of alum or other polyvalent metal ions.

Example 14

In a reaction vessel equipped with stirrer and reflux condenser 300 parts of n-butanol was heated under a nitrogen atmosphere to 100° C. There was slowly added in butanol solution 49 parts of N-(β-methacrylamidoethyl)ethyleneurea, 261 parts of methyl methacrylate, 214 parts of ethyl acrylate, and 1.2 parts of benzoyl peroxide. This reaction mixture was kept at about 102° C. There was added 0.5 part of benzoyl peroxide. Stirring and heating were continued. After two more hours another portion of 0.5 part of benzoyl peroxide was added. Heating was continued for two hours. Butanol was taken off under reduced pressure and xylene was added to give a solution containing 40% solids and having a viscosity of W+. This was a useful lacquer.

Example 15

A solution was prepared from 9.36 parts of N-(β-methacrylamidoethyl)-2-imidazolidone, 0.463 part of N-tert.-butylaminoethyl methacrylate, 30 parts of dimethylformamide, 0.3 part of mercaptoethanol, and 0.05 part of dimethyl azodiisobutyrate. This solution was blanketed with nitrogen and heated at 75° C. for 20 hours. The reaction mixture was then poured into acetone to precipitate copolymer. The acetone was decanted off. The solid was dissolved in a small amount of water and reprecipitated with acetone. The acetone was decanted off and the solid material was dried at 60° C./0.5 mm. for 30 hours. There was thus obtained a white, brittle solid, which weighed 8.1 parts and which by analysis contained 19.8% of nitrogen. The theoretical nitrogen content for the 95:5 copolymer is 20.6% of nitrogen.

A viscose dope was treated with the above copolymer in an amount of 10% of the weight of the cellulose therein. Fibers were formed therefrom by acid regeneration. These were dried, passed through a bath containing 5% of formaldehyde, passed through a bath containing 1% of hydrochloric acid, dried, and heated at 275° F. The resulting fibers possessed increased affinity for acid dyes and showed a much lower swelling ratio in water.

The above copolymer may also be applied to cellulose acetate fibers from a size bath containing 5% to 10% of the copolymer. The treated fibers could be dyed readily and possessed good resistance to gas fading.

In place of the above N-tert.-butylaminoethyl methacrylate there may be used in the same way N-tert.-butylaminoethyl acrylate, dimethylaminoethyl (or propyl) acrylate or methacrylate, diethylaminoethyl (or propyl) acrylate or methacrylate, N-dimethylaminoethylacrylamide, N-dimethylaminoethylmethacrylamide, or the like with comparable result. The above N-($\beta$-methacrylamidoethyl)-2-imidazolidone may be replaced with other acrylamides of this invention.

A useful range for the amine-substituted acrylic ester or amide is from 1% to 20% of the copolymer for the modification of regenerated cellulose or cellulose acetate, but larger proportions may also be used. It should also be pointed out that these interpolymers may be extended, as it were, with an acrylic or methacrylic ester, interpolymers based on 10% to 70% of such an ester being useful. For instance, a particularly useful terpolymer can be made from a mixture of 60 parts of ethyl acrylate, 20 parts of N-($\beta$-methacrylamidoethyl)-2-imidazolidone, and 20 parts of tert.-butylaminoethyl methacrylate, which is interpolymerized by methods illustrated above.

Example 16

A solution was prepared from 7.9 parts of N-($\beta$-methacrylamidoethyl)-2-imidazolidone, 3.0 parts of methacrylamide, 21.8 parts of water, 0.12 part of mercaptoethanol, and 0.04 part of dimethyl azodiisobutyrate. This solution was heated under nitrogen at 65° C. for 16 hours. The reaction mixture was poured into acetone to precipitate the polymer. The acetone was decanted off. The solid polymer was dissolved in a minimum of water and reprecipitated with acetone. The precipitate was dried at 60° C./0.5 mm. for 18 hours to give 10.9 parts of a white, brittle solid, which contained 17.7% of nitrogen. A 40:60 molar ratio of N-(methacrylamidoethyl)-2-imidazolidone to methacrylamide requires 17.9% nitrogen. An aqueous 33% solution of this copolymer had a Gardner-Holdt viscosity of D.

In place of methacrylamide there may be used in the same way acrylamide, N-methylacrylamide, N-methylmethacrylamide, N-hydroxyethylacrylamide, or other substituted acrylic amides.

A wet-strength paper resin was prepared from 5.44 parts of the copolymer of methacrylamide and N-($\beta$-methacrylamidoethyl)-ethyleneurea and 8.23 parts of aqueous 36.5% formaldehyde as described in Example 11. This resin was applied to unbleached kraft at pH 4. The wet strength values in pounds per inch were 4.9 after one day and 5.1 after seven days. When 3% alum was added, the corresponding tensile strengths were 4.6 and 5.0 lbs./inch.

Example 17

A mixture of 5.9 parts of N-($\beta$-methacrylamidoethyl)-ethyleneurea, 4.9 parts of ureidoethyl vinyl ether, 0.12 part of mercaptoethanol, 21.6 parts of dimethylformamide, and 0.05 part of diethyl azodiisobutyrate was treated as in Example 16 to give 6.6 parts of white, brittle, solid copolymer. An aqueous 33⅓% solution of this copolymer had a Gardner-Holdt viscosity of F—.

Example 18

A pressure vessel was charged with 1.441 parts of acrylic acid, 15.78 parts of N-($\beta$-methacrylamidoethyl)-ethyleneurea, 34.4 parts of water, 0.15 part of mercaptoethanol, and 0.1 part of dimethyl azodiisobutyrate, flushed with nitrogen, sealed, and heated at 65° C. for 16 hours. A copolymer was formed. It was precipitated by addition of acetone, solution in water, and reprecipitation with acetone. The reprecipitated copolymer was separated and dried at 60° C./0.5 mm. for 16 hours. There was thus obtained a brittle, white solid in an amount of 17.7 parts. A 33⅓% aqueous solution of this copolymer had a Gardner-Holdt viscosity of E. Potentiometric titration of this copolymer indicated that it contained 8.1% acrylic acid; the charge contained 8.4% acrylic acid.

When this copolymer is added to a viscose dope at 10% of the weight of the cellulose therein films may be formed therefrom, which, upon treatment with formaldehyde solution containing a curing catalyst and upon baking at about 300° F. for five minutes, become highly resistant to cellulose solvents. The carboxylic groups derived from acrylic acid give the films substantivity to basic dyes.

The above acrylic acid may be replaced with like effect with such interpolymerizable acids as methacrylic, maleic, fumaric, or itaconic. The preferred proportion of acid is from 5% to 50%.

Such copolymers of N-($\beta$-methacrylamidoethyl)ethyleneurea with acrylic acid can be condensed with formaldehyde to yield efficient and unusually stable wet-strength paper resins. An advantage of these copolymers is that the presence of units from acrylic acid makes it possible to cross-link the derived wet-strength resins with alum or other polyvalent metals. The formaldehyde derivative of the copolymer described above was prepared by adding a solution containing 2.70 parts of copolymer in 10 parts of water in ten minutes to a solution of 5.14 parts of 36.5% formaldehyde in 15 parts of water at a pH of 8.5. The reaction mixture was then heated for two hours at 65° C. When this resin was applied at 1% solids and pH 4 to unbleached kraft, the paper obtained had wet tensile strengths of 6.5 lbs./inch after one day and 6.3 lbs./inch after seven days. However, use of 3% alum in preparation of the paper gave a marked improvement in wet strengths, the corresponding values then being 9.6 and 10.4 lbs./inch.

Example 19

A mixture of 9.8 parts of N-($\beta$-methacrylamidoethyl)-ethyleneurea, 4.30 parts of vinyl acetate, 0.15 part of mercaptoethanol, 0.1 part of dimethyl azodiisobutyrate, and 28.3 parts of dimethylformamide was heated at 65° C. under nitrogen for 16 hours. The reaction mixture was poured into acetone, whereby the copolymer was precipitated. The acetone was decanted off. The copolymer was dissolved in water and reprecipitated with acetone. It was dried at 60° C./0.5 mm. for 16 hours to give 10.4 parts of a white, brittle solid which contained 18.9% of nitrogen. The copolymer would thus contain 11% of vinyl acetate by weight.

As much as 20% of this copolymer may be used as a modifier for aqueous urea-formaldehyde condensates. The modified condensates have increased resistance to water and aqueous solutions. Other copolymers may be similarly prepared and similarly used where the major portion of the copolymer is obtained from an amide of this invention. When the major proportion of the copolymer is vinyl acetate, the resulting product is solvent soluble. This type of solubility is obtained with even smaller proportions of ester as other vinyl esters are substituted for vinyl acetate. Such esters as vinyl butyrate, vinyl 2-ethylhexoate, vinyl laurate, or vinyl stearate may be used over a wide range of proportions of the two types of monomers. An interesting copolymer is made, for example, with 1% to 10% of N-($\beta$-methacrylamidoethyl)ethylenethiourea and 99% to 90% of vinyl laurate or stearate or mixture thereof. It is soluble in lubricating oils to supply improvement in viscosity index and anti-corrosive action.

Example 20

A pressure vessel was charged with 15.78 parts of N-($\beta$-methacrylamidoethyl)ethyleneurea, 2.60 parts of 5-hydroxypentyl vinyl ether, 36.8 parts of dimethylformamide, 0.15 part of mercaptoethanol, and 0.1 part of dimethyl azodiisobutyrate, flushed with nitrogen, sealed, and heated at 65° C. for 16 hours. The resulting copolymer was not completely soluble in the reaction mixture, requiring additional water to effect solution. This solution was poured into acetone with precipitation of product. Acetone was poured off. The residue was dissolved in water and reprecipitated with acetone. The acetone-insoluble material was separated and dried at 60° C./0.5 mm. for 18 hours, yielding 15.9 parts of a white, brittle solid, which contained 19.7% of nitrogen. This copolymer thus contained units from the amide and ether in the ratio of 92.5:7.5 by weight.

This copolymer was taken up in an aqueous 5% formaldehyde solution which was adjusted with acid to a pH of 4.0, and applied to woolen cloth. The cloth was heated at 270° F. for 15 minutes. The resulting woolen cloth was dimensionally stable when washed in hot soap solution.

*Example 21*

By the same procedure there were copolymerized 15.78 parts of N-($\beta$-methacrylamidoethyl)ethyleneurea and 1.76 parts of hydroxyethyl vinyl ether with the aid of 0.15 part of mercaptoethanol and 0.1 part of dimethyl azodiisobutyrate. The product amounted to 9.4 parts of a water-soluble, acetone-insoluble, white brittle solid. From the analysis of this copolymer (20.0% of nitrogen) it contained a ratio of 7:1 units from the amide and ether respectively.

*Example 22*

There was heated under nitrogen in a closed vessel at 65° C. for 16 hours a mixture of 15.78 parts of N-($\beta$-methacrylamidoethyl)ethyleneurea, 4.56 parts of lauryl vinyl sulfide, 40.7 parts of dimethylformamide, 0.15 part of mercaptoethanol, 0.1 part of dimethyl azodiisobutyrate. The reaction mixture was poured into acetone with formation of a precipitate, from which the solution was decanted. The residue was dissolved in a small amount of water and reprecipitated with acetone. The precipitated solid was separated and dried at 60° C./0.5 mm. for 18 hours. The yield was 13.8 parts of a white, brittle solid, containing 17.0% of nitrogen and 2.2% of sulfur. This indicates a ratio of amide units to sulfide units of 83:17 by weight.

This copolymer exhibits interesting foaming and detergent properties. An aqueous 1% solution has a surface tension below 40 dynes/cm.

When copolymers are formed with 95 to 80 parts of lauryl vinyl sulfide and 5 to 20 parts of N-($\beta$-methacrylamidoethyl)ethyleneurea, organic solvent-soluble copolymers are formed. These are interesting as additives for lubricating oils, to which they impart detersive and anticorrosive properties.

*Example 23*

The procedure of the previous example was applied to a mixture of 2.13 parts of N-($\beta$-methacrylamidoethyl)-2-thioimidazolidone, 7.65 parts of methacrylamide, 0.15 part of mercaptoethanol, 0.1 part of dimethyl azodiisobutyrate, and 29.3 parts of dimethylformamide. The copolymer was precipitated with acetone, dissolved in water, reprecipitated with acetone, and dried at 60° C./0.5 mm. for 18 hours. The yield was 6.5 parts of a copolymer containing 3.5% of sulfur. This analysis indicates the copolymer contained 23% by weight of the thioimidazolidone derivative.

In place of the above methacrylamide there may be used acrylamide, N-methylacrylamide, N-butylmethacrylamide, N-dodecylacrylamide, etc. A copolymer from N - dodecylmethacrylamide and N($\beta$ - methacrylamidoethyl)-2-imidazolidone in an 80:20 ratio is oil-soluble and may be used as an additive for lubricating oils.

*Example 24*

The procedure of Example 23 was followed with a mixture of 2.13 parts of N-($\beta$-methacrylamidoethyl)-2-thioimidazolidone, 11.70 parts of ureidoethyl vinyl ether, 27.7 parts of dimethylformamide, and 0.1 part of dimethyl azodiisobutyrate. There was obtained 4.9 parts of a white, brittle copolymer which contained 5.1% of sulfur. Thus, the copolymer contained 34% by weight of the thioimidazolidone derivative.

*Example 25*

As above, a mixture of 4.27 parts of N-($\beta$-methacrylamidoethyl)-2-thioimidazolidone, 9.54 parts of acrylonitrile, 27.6 parts of dimethylformamide, and 0.1 part of dimethyl azodiisobutyrate was copolymerized at 65° C. for 16 hours. The copolymer was precipitated with acetone, dissolved in dimethylformamide, reprecipitated with acetone, and dried at 60° C./0.5 mm. for 18 hours. There resulted 8.3 parts of a hard, tan solid, which contained 3.4% of sulfur. This copolymer would be made from the above amide and acrylonitrile in a 6.8:93.2 ratio.

In place of the above thioimidazolidone there may be used the corresponding oxygen analogue. The copolymer from acrylonitrile and N-($\beta$-methacrylamidoethyl)-2-imidazolidone is more readily soluble in solvents for polyacrylonitrile than is polyacrylonitrile itself and this copolymer can readily be spun into fibers. In place of the above methacrylamidoethylthioimidazolidone there may be used the corresponding N-($\gamma$-methacrylamidopropyl)hexahydro-2-thiopyrimidone or the corresponding acrylamido compounds.

*Example 26*

A solution containing 19.7 parts of N-($\beta$-methacrylamidoethyl)-2-imidazolidone, 90 parts of ethyl acrylate, 0.23 part of benzoyl peroxide, and 104.9 parts of n-butanol was added with stirring over 2.25 hours to 60 parts of n-butanol which had been heated to 102° C. under a blanket of nitrogen. Stirring and heating at 102°±2° C. were continued for three hours, there being added 0.094 part of benzoyl after the second hour of stirring. Enough butanol was added to bring the total weight of the reaction mixture to 292.4 parts. The resulting solution contained 36.2% of a copolymer in a 1:9 mole ratio of amide to ester. It had a Gardner-Holdt viscosity of C.

To a solution of 2.97 parts of paraformaldehyde in 40 parts of butanol was added 87.72 parts of the above copolymer solution. The mixture was heated at 53°–58° C. for six hours. During this period formic acid was added in an amount sufficient to lower the pH of the reaction mixture from 8.5 to 3.5. The reaction mixture was then neutralized with aqueous sodium hydroxide solution and filtered through a filter-aid to give 171 parts of a colorless liquid, containing 17.74% of the butoxymethyl derivative of the copolymer.

This modified copolymer is useful as a size or stiffening agent for nylon.

The above ethyl acrylate may be replaced with similar proportions of butyl acrylate, ethyl methacrylate, methyl acrylate, amyl methacrylate, or mixtures of acrylates and/or methacrylates.

Other alkoxymethyl derivatives may be formed, such as the methoxymethyl, ethoxymethyl, or propoxymethyl.

Instead of copolymerization in solution these copolymers may be prepared by emulsion polymerization or by bulk polymerization.

Copolymers of methacrylamidoalkyl-2-imidazolidone, acrylamidoalkyl-2-imidazolidone, methacrylamidoalkyl-hexahydro-2-pyrimidone, or acrylamidoalkylhexahydro-2-pyrimidone, or their thio analogues and a lower alkyl acrylate or methacrylate are useful for stabilizing wool. It is noteworthy that these copolymers can so act without the addition of formaldehyde. The proportion of one or more of the above amido compounds may vary from 5% to 25% of the copolymer, although 5–10% is the preferred range.

When a solution of a 5:95 copolymer of methacrylamidopropylhexahydro-2-pyrimidone and butyl acrylate was applied at 10% solids to woolen fabric together with a small amount of ammonium chloride or oxalic acid to serve as catalyst and the thus treated fabric was dried at 240°–270° F. the fabric became shrink-resistant. Even after this fabric was washed in a Launderometer for five hours in a soap solution, the fabric remained shrink-resistant. There was no felting and the fabric retained its hand.

A similar treatment wherein the fabric after being padded through the copolymer solution was treated with a one per cent formaldehyde solution likewise gave a stable fabric which was highly resistant to washing.

*Example 27*

A portion of 200 parts of butanol was stirred and heated under nitrogen to about 100° C. and thereto was added over 2.5 hours a solution of 49.3 parts of N-(β-methacrylamidoethyl)-2-imidazolidone, 21.5 parts of methacrylic acid, 450 parts of methyl methacrylate, 5.93 parts of azodiisobutyronitrile, and 454 parts of n-butanol. At this time 0.296 part of azodiisobutyronitrile was added and heating was continued for two hours at about 102° C., when another addition of 0.296 part of this catalyst was made. Stirring and heating were continued for another hour, whereupon 500 parts of xylene was added. The mixture was stripped at 70°–80° C. under reduced pressure with removal of butanol. Some additional xylene was added as distillation proceeded. There was obtained a very light yellow viscous solution amounting to 1507 parts, containing 30.8% of copolymer, and having a Gardner-Holdt viscosity of U—. The acid number of the solution was 11.

*Example 28*

A solution containing 9.86 parts of N-(β-methacrylamidoethyl)-2-imidazolidone, 5.21 parts of styrene, 30.1 parts of dimethylformamide, and 0.11 part dimethyl azodiisobutyrate was heated under nitrogen for eighteen hours at 65° C. The copolymer was precipitated with acetone, dissolved in dimethylformamide, reprecipitated with acetone, and dried for eighteen hours at 60° C./0.5 mm. to give 4.5 parts of a light tan, brittle solid. The product contained 11.6% nitrogen which corresponded to a copolymer from 54% by weight of the methacrylamide and 46% of styrene.

*Example 29*

To a solution of 9.86 parts of N-(β-methacrylamidoethyl)-2-imidazolidone and 5.25 parts of 2-vinylpyridine in 30.2 parts of dimethylformamide was added 0.11 part of dimethyl azodiisobutyrate. The solution was heated under nitrogen in a pressure vessel for eighteen hours at 65° C. The reaction mixture was worked up as in Example 28 to give 5.2 parts of a light tan, brittle solid which contained 17.1% nitrogen. This corresponded to a copolymer based on 47% by weight of the methacrylamide.

*Example 30*

A solution containing 1.07 parts of N-(β-methacrylamidoethyl)-2-thioimidazolidone, 8.33 parts of N-tert.-butylaminoethyl methacrylate, 18.8 parts of dimethylformamide, and 0.11 part of dimethyl azodiisobutyrate was heated under nitrogen for sixteen hours at 65° C. The product was precipitated with water, dissolved in dimethylformamide, reprecipitated with water, and dried for eighteen hours at 65° C./0.5 mm. There was obtained 7.0 parts of a white, brittle solid which contained 1.1% of sulfur and 8.4% of nitrogen. The calculated values for a copolymer containing 7% by weight of the methacrylamide are 1.05% of sulfur and 8.42% of nitrogen.

*Example 31*

A mixture of 21.69 parts of N-(β-methacrylamidoethyl)-2-imidazolidone, 6.02 parts of methyl acrylate, 1.44 parts of acrylic acid, 58.3 parts of dimethylformamide, 0.15 part of mercaptoethanol, and 0.20 part of dimethyl azodiisobutyrate was copolymerized under nitrogen for eighteen hours at 65° C. The copolymer was precipitated with acetone, dissolved in water, reprecipitated with acetone, and dried for 24 hours at 60° C./0.5 mm. to give 29.0 parts of a white, brittle solid. The Gardner-Holdt viscosity of a 33⅓% aqueous solution of this copolymer was Q+.

*Example 32*

The procedure described in Example 31 was followed with a mixture of 21.69 parts of N-(β-methacrylamidoethyl)-2-imidazolidone, 6.88 parts of methyl acrylate, 0.72 part of acrylic acid, 58.6 parts of dimethylformamide, 0.15 part of mercaptoethanol, and 0.20 part of dimethyl azodiisobutyrate. There was obtained 29.4 parts of a white, brittle solid, a 33⅓% aqueous solution of which had a Gardner-Holdt viscosity of D.

*Example 33*

A mixture of 23.66 parts of N-(β-methacrylamidoethyl)-2-imidazolidone, 6.88 parts of methyl acrylate, 61.1 parts of dimethylformamide, 0.15 part of mercaptoethanol, and 0.20 part of dimethyl azodiisobutyrate was copolymerized as described in Example 31. The product was precipitated with acetone, dissolved in water, reprecipitated with acetone, and dried at 60° C./0.5 mm. for one day to give 28.8 parts of a white, brittle solid. An aqueous 33⅓% solution of this copolymer had a Gardner-Holdt viscosity of H.

The compounds of this invention are modified acrylates in which the nitrogenous heterocycle exerts a controlling influence on the behavior and properties of the compounds, their polymers, and interpolymers therefrom. The compounds are prepared from readily available materials by convenient methods in simple apparatus. The compounds and polymeric products therefrom have considerable stability. The polymers are formed usually with free-radical catalysts, but are also capable of being formed with anionic catalysts. These are used in essentially anhydrous systems at low temperatures. Sodium and sodium methoxide are convenient examples of this class. The molecular weights of polymeric materials can be regulated with the aid of chain transfer agents. If desired, these weights can be carried to high values.

As has been mentioned at various points, very stable methylol derivatives can be formed from polymers and copolymers. Methylol derivatives can also be formed from the monomers under similar conditions, i. e. in aqueous or alcoholic solutions at pH's from 7.5 to 10. When an alcoholic solution is acidified, as with formic or phosphoric acid to a pH of 5 to 3, alkoxymethyl compounds result. When the monomers are the starting materials, the alkoxylmethyl derivatives can be polymerized and thus polymers and copolymers obtained which are free from formaldehyde.

Monomers of this invention are readily reacted at the acrylic function to form soluble polymers and, when other free-radical polymerizable monovinylidene compounds are used as comonomers, to form soluble copolymers. These soluble products can be insolubilized through reaction at their nitrogenous function. The compounds of this invention are thus of interest in providing a valuable new kind of "two stage" polymeric material.

With respect to this property the monomers, polymers, and copolymers of this invention are unusual because they couple the second stage of reactivity with unusual stability, the solids or solutions thereof being capable of long storage without deterioration. Yet when final cross-linking is wanted, this result can be conveniently achieved with dispatch and efficiency. This is due in large part to the particular molecular configuration of these materials. The chain intervening between the two reactive functional groups is of such nature and size that the second stage reaction occurs under control, yet with effectiveness and efficiency.

We claim:
1. A process for preparing compounds of the structure

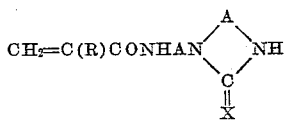

which comprises reacting a compound of the formula

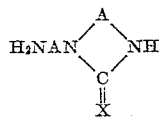

with a compound of the formula $$CH_2=C(R)COHal$$

between −20° and 50° C. in the presence of an acceptor for hydrogen halides, in the above formulae R being selected from the class consisting of hydrogen and the methyl group, A being an alkylene group of two to three carbon atoms with at least two carbon atoms between nitrogen atoms, X being selected from the class consisting of oxygen and sulfur, and Hal being selected from the class consisting of chlorine and bromine.

2. A process for preparing compounds of the structure

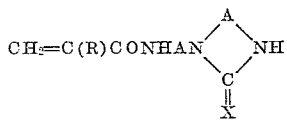

which comprises reacting about two moles of a compound of the formula

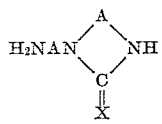

with a mole of a compound of the formula $$CH_2=C(R)COCl$$

between −20° and about 50° C., in the above formula R being selected from the class consisting of hydrogen and the methyl group, A being an alkylene group of two to three carbon atoms with at least two carbon atoms between nitrogen atoms, X being selected from the class consisting of oxygen and sulfur.

3. A process for preparing a compound of the formula

which comprises reacting together, between −20° and about 50° C. in the presence of an acceptor for hydrogen chloride, acrylyl chloride and a compound of the formula

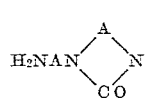

A being an alkylene group of two to three carbon atoms with at least two carbon atoms between nitrogen atoms.

4. A process for preparing a compound of the formula

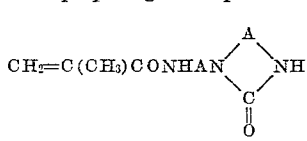

which comprises reacting together, between −20° and about 50° C. in the presence of an acceptor for hydrogen chloride, methacrylyl chloride and a compound of the formula

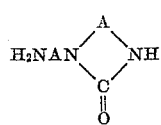

A being an alkylene group of two to three carbon atoms with at least two carbon atoms between nitrogen atoms.

5. A process for preparing a compound of the formula

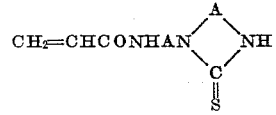

which comprises reacting together, between −20° and about 50° C. in the presence of an acceptor for hydrogen chloride, acrylyl chloride and a compound of the formula

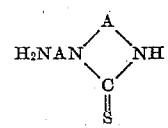

A being an alkylene group of two to three carbon atoms with at least two carbon atoms between nitrogen atoms.

6. A process for preparing a compound of the formula

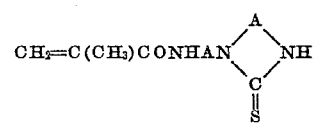

which comprises reacting together, between −20° and about 50° C. in the presence of an acceptor for hydrogen chloride, methacrylyl chloride and a compound of the formula

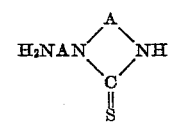

A being an alkylene group of two to three carbon atoms with at least two carbon atoms between nitrogen atoms.

7. A compound of the structure

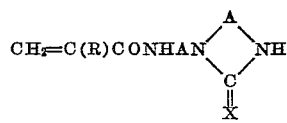

R being selected from the class consisting of hydrogen and the methyl group, A being an alkylene group of two to three carbon atoms with at least two carbon atoms between nitrogen atoms, X being selected from the class consisting of oxygen and sulfur.

8. An addition polymer of a compound of claim 7.
9. An addition copolymer of a compound of claim 6 and another copolymerizable vinylidene compound.
10. An addition copolymer of claim 9 in which the vinylidene compound is a monovinylidene compound.
11. A compound of the structure

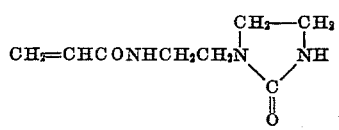

12. An addition polymer of the compound of claim 11.
13. An addition copolymer of the compound of claim 11 and another copolymerizable monovinylidene compound.

14. A compound of the structure

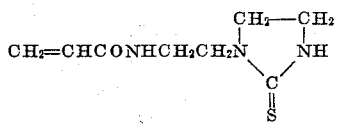

15. An addition polymer of the compound of claim 14.
16. An addition copolymer of the compound of claim 14 and another copolymerizable monovinylidene compound.
17. A compound of the structure

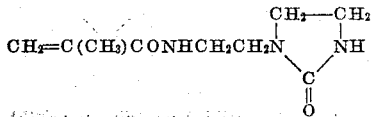

18. An addition polymer of the compound of claim 17.
19. An addition copolymer of the compound of claim 17 and another copolymerizable monovinylidene compound.
20. A compound of the structure

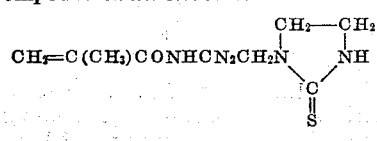

21. An addition polymer of the compound of claim 20.
22. An addition copolymer of the compound of claim 20 and another copolymerizable monovinylidene compound.
23. A compound of the structure

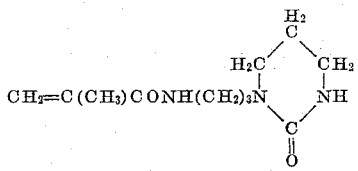

24. An addition polymer of the compound of claim 23.
25. An addition copolymer of the compound of claim 23 and another monovinylidene compound.

References Cited in the file of this patent

UNITED STATES PATENTS

| | | |
|---|---|---|
| 2,090,596 | Jacobson | Aug. 17, 1937 |
| 2,311,548 | Jacobson et al. | Feb. 16, 1943 |
| 2,516,836 | Drechsel | Aug. 1, 1950 |
| 2,541,152 | Cairns | Feb. 13, 1951 |